April 7, 1959
I. JEPSON
2,881,299
COMBINED WAFFLE MAKER AND SANDWICH GRILL
Filed Oct. 31, 1952
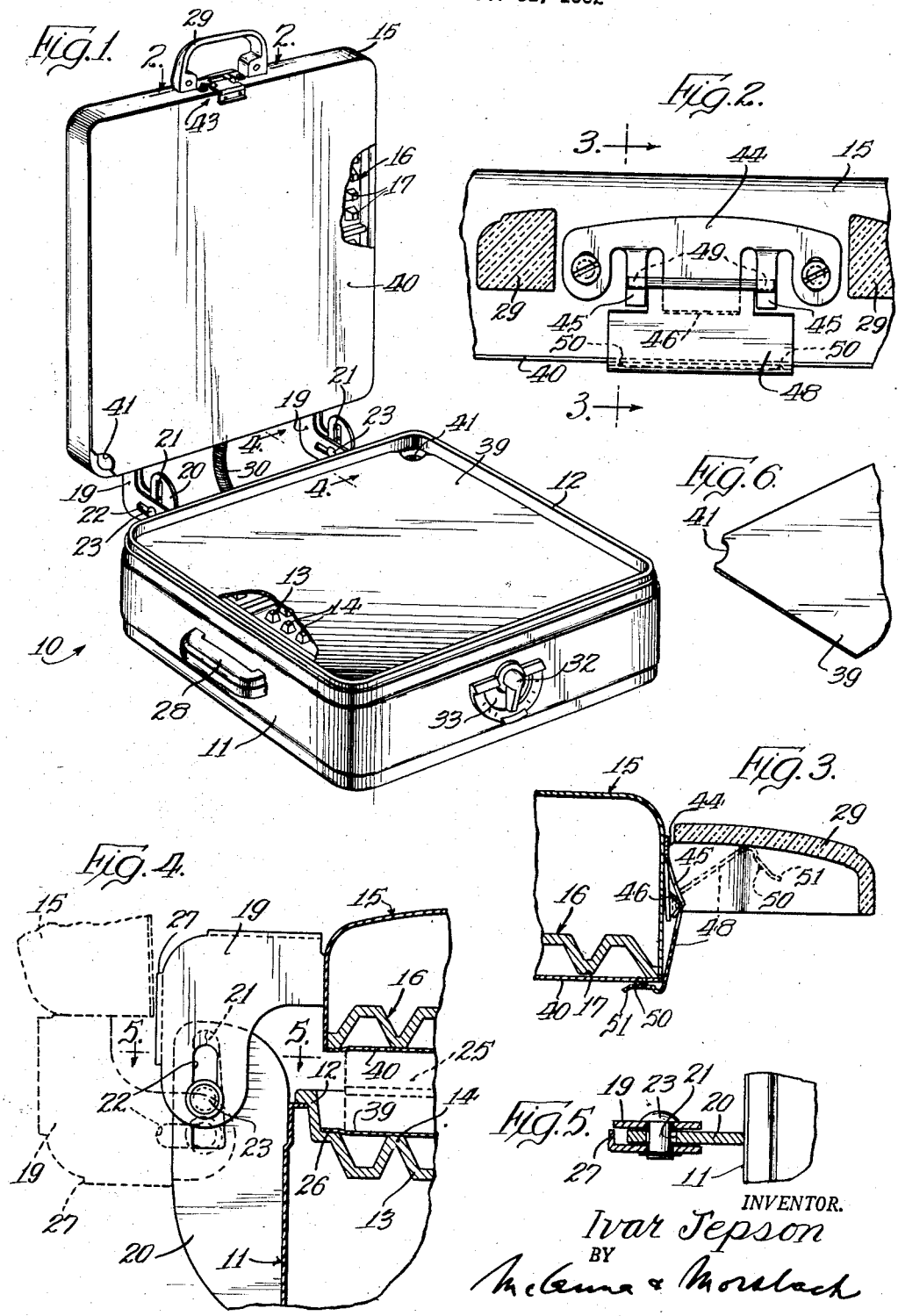
INVENTOR.
Ivar Jepson
BY
McKenna & Morelock
Attys.

United States Patent Office 2,881,299
Patented Apr. 7, 1959

2,881,299

COMBINED WAFFLE MAKER AND SANDWICH GRILL

Ivar Jepson, Oak Park, Ill., assignor to Sunbeam Corporation, Chicago, Ill., a corporation of Illinois Application October 31, 1952, Serial No. 317,936

3 Claims. (Cl. 219—19)

The present invention relates to a combined waffle maker and sandwich grill, and more particularly to an improved arrangement for converting any conventional waffle iron or waffle baker to an improved sandwich toaster.

Waffle irons or waffle bakers, as they are commonly termed, have been developed to a high state of perfection with fully automatic control of the heating of the grids thereof, so that any selected desired temperature may be maintained at the grids of the waffle iron. One such satisfactory waffle baker or waffle iron is disclosed and claimed in Jepson Patent No. 2,342,077, granted February 15, 1944, and assigned to the same assignee as the present application. Prior to the invention disclosed in the above-mentioned Jepson patent, waffle irons were generally of a configuration to make circular waffles. Since that time the trade has generally gone toward the making of rectangular or square waffles.

Another appliance commonly employed by housewives is what is generally termed an electric sandwich toaster or grill. Such grills have generally had a rectangular configuration. Since the advent of the waffle iron for making rectangular waffles, there has been agitation for a combined waffle iron and grill whereby the same unit may be used for both purposes. Some manufacturers have stressed a combination unit for making waffles, toasting sandwiches, frying eggs, bacon, etc. As a practical matter, it has been discovered that the frying of bacon and eggs on such a combination unit is very inconvenient and unsatisfactory as compared with doing the same job on a gas or an electric range. There is, however, a considerable demand for a combination waffle iron and sandwich toaster, and there have been on the market for some time combination units for accomplishing this purpose. In general, these combination units have been unsatisfactory. If designed to make good waffles, the combination units heretofore offered have been much too slow when used for toasting sandwiches, and unsatisfactory toasting has occurred due to hot and cold spots in the heating surface. It has been suggested to place a sort of pan or plate arrangement over each of the opposed grids of a waffle baker with the opposed surfaces of the pans or plates engaging the sandwiches to be toasted. Extensive tests on such devices available on the market have proven them to be very unsatisfactory.

Accordingly, it is an object of the present invention to provide a new and improved combined waffle baker or waffle iron and sandwich toaster which will overcome the unsatisfactory nature of similar prior art devices and which is completely capable of producing satisfactory waffles when used as a waffle baker, and which is equally satisfactory for making toasted sandwiches when used for this purpose.

It is a further object to provide simple means for converting a conventional waffle baker to a sandwich toaster, which sandwich toaster is more satisfactory than any similar devices heretofore available.

It is another object of the present invention to provide a combined waffle baker and sandwich grill wherein with very minor changes a conventional automatic waffle baker may be converted to an automatic sandwich toaster capable of toasting sandwiches in a minimum of time and in a uniform manner.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawing in which:

Fig. 1 is a perspective view of a waffle baker embodying the present invention which with simple means is illustrated as having been converted to a highly satisfactory sandwich toaster;

Fig. 2 is a fragmentary enlarged sectional view taken on line 2—2 of Fig. 1;

Fig. 3 is a sectional view taken on line 3—3 of Fig. 2, assuming that Fig. 2 shows the complete structure;

Fig. 4 is an enlarged view taken on line 4—4 of Fig. 1 showing two positions of the waffle baker, the position of Fig. 1 being shown in dotted lines, and the position wherein a sandwich is being toasted being shown in solid lines;

Fig. 5 is a sectional view taken on line 5—5 of Fig. 4; and

Fig. 6 is a partial perspective view of an element used in converting the waffle baker of the present invention to a sandwich toaster.

The present invention is primarily concerned with employing metal or aluminum foil in sheet form of a thickness preferably between one and ten thousandths of an inch to overlie the grids of a waffle baker and furnish the toasting surface when used as a sandwich toaster. Suitable means for holding the metal foil sheet which is associated with the portion of the waffle baker often termed the cover are provided. This means is readily operated to permit substantially instantaneous conversion from a waffle baker to a sandwich toaster.

Referring now to the drawing, there is illustrated the conventional waffle baker generally designated by the reference numeral 10, although, as illustrated in Fig. 1, the waffle baker has associated therewith the means for converting the same to a sandwich toaster. The construction of the waffle baker itself, as shown in Fig. 1, is preferably substantially identical with that disclosed in the above-mentioned Jepson patent and comprises a lower case or base 11 of substantially square or rectangular configuration. The lower case has an upstanding peripheral flange 12 adjacent the upper edge thereof defining somewhat of a receptacle. Actually, this flange 12 is integral with the lower grid designated at 13. As disclosed in the above-mentioned Jepson patent, the lower grid is preferably divided into quadrants containing the conventional grid-like design, including the projections 14. Preferably the lower grid with the upstanding peripheral flange 12 is formed of a cast material such as aluminum or the like having substantial thickness. Aluminum is very satisfactory, since it is an excellent conductor of heat and tends to insure uniform temperature throughout all portions thereof.

As disclosed in the above-mentioned Jepson patent, the waffle baker 10 also includes an upper case or cover 15 of the same peripheral shape as the lower case and capable of fitting within the peripheral flange 12. The upper case or cover 15 contains an upper grid which is substantially identical with the lower grid 13 and is designated by the reference numeral 16 in Figs. 3 and 4 of the drawing. It, likewise, includes projections 17 which correspond to the projections 14, so that the completed waffle will have the well-known dimpled configuration of the conventional waffle. It will be apparent that the grids 13 and 16 when used for baking waffles are moved into opposed or overlying relationship, with the waffle resting on the lower grid 13, and the upper grid 16 resting on the waffle.

For the purpose of relating the upper case 15 with the lower case 11, and to cause movement of the upper case 15 from the position shown in Fig. 1, or at least from a position remote from the case 11 to a position overlying case 11 for cooking a waffle therebetween, there are provided hinge members 19 and 20, respectively. Two hinge members 20 are supported in spaced relationship from what might be termed the rear side of the case 11, while two hinge members 19 extend from the corresponding side of the case 15. As illustrated, the hinge members 19 are bifurcated to receive between the bifurcations thereof the hinge members 20. The hinge members 20 are each provided with an elongated slot 21 extending in a generally vertical direction. Similarly, the hinge members 19 are provided with an elongated slot 22 which extends in a generally vertical direction when the waffle baker is in the position shown by solid lines in Fig. 4 of the drawing, but extends in a generally horizontal direction when the waffle baker is in the position shown in Fig. 1 of the drawing. Suitable pins 23, extending through the elongated slots 21 and 22, complete the hinge means for the waffle baker. It will be apparent that the elongated slots 21 and 22 of the hinge means will permit substantial separation of the grids 13 and 16 when the upper case is in the position shown by solid lines in Fig. 4 of the drawing. Actually, a sandwich, designated by the reference numeral 25, is shown interposed between the upper and lower grids of the waffle baker 11, so that substantial separation of the grids exists. If no sandwich 25 were interposed, the upper grid would rest on a suitable ledge 26 defined around the periphery of the lower grid immediately inside the peripheral flange 12.

For the purpose of holding the upper case 15 in the position shown in Fig. 1 of the drawing, the hinge portions 19 are preferably provided with an integral lateral flange 27, best shown in Fig. 5 of the drawing, which lateral flange engages with the edge of the corresponding hinge member 20 as shown by dotted lines in Fig. 4 of the drawing, to hold the case 15 in the upper or open position of the waffle baker, as shown in Fig. 1 of the drawing.

In order that the waffle baker may readily be handled, it is provided with a pair of handles such as 28 attached to the lower case 11. Similarly, the front edge of the upper case 15 is provided with a suitable handle 29. Preferably, the handle 29 is constructed so as to define a sort of recess or partial enclosure for readily receiving the fingers of the operator and for a purpose which will become apparent as the following description proceeds.

It will be understood that suitable electrical heating means, such as a resistance element, will be associated with each of the grids 13 and 16 to insure uniform heating of these grids. This construction forms no part of the present invention, but is fully disclosed in the above-mentioned Jepson patent. In the drawing a suitable coiled spring 30 is illustrated which shields the leads comprising the electric circuit interconnecting the heating elements associated with the two grids. A suitable power cord, not shown, will also be associated with the waffle baker 10, and preferably with the lower case 11 thereof. As is fully disclosed in the above-mentioned Jepson patent, the temperature of the grids 13 and 16 is maintained at any selected desired temperature by virtue of a suitable thermoresponsive control means not shown. A manually adjustable knob 32 is provided to control the temperature setting of this thermoresponsive device. Preferably, also, suitable indicating means visible through a luminous dial 33 associated with the lower case 11 inform the operator of the temperature condition of the grids 13 and 16.

The arrangement thus far described, with the possible exception of the hinge means permitting a greater than normal separation between the upper and lower grids when in the solid line position shown in Fig. 1, is substantially that disclosed in the above-mentioned Jepson patent, and is described in order better to understand the present invention.

It has been pointed out that if a thin sheet of metal such as aluminum foil or the like is superimposed in intimate contact with the grids of the waffle baker 10, the surface thereof may be maintained substantially at the temperature of the grids themselves. It is essential, however, that this metal foil be thin enough to conform to any predetermined shape, and particularly that it conform with the surface defined by the projections 14 of the lower grid 13, or the projections 17 of the upper grid 16 at every projection thereof. It will be apparent that as soon as the metal sheet has a thickness which does not permit conformance at every point with the projections of the associated grid, then the accurate temperature control afforded by the thermoresponsive devices associated with the grids is lost insofar as the surface of the metal sheet is concerned. On the other hand, if the metal sheet is too thin, the heat conductive paths between the portions in intimate heat exchange engagement with the projections 14 and 17 and the portions not so in engagement will be insufficient to insure uniform heat distribution and hot spots and cooler spots on the surface will result, with the resultant scorching in places of a sandwich or other material to be toasted. It has been discovered after extensive research that such sheet metal inserts should be within the range of one to ten thousandths of an inch in thickness, and very successful results have been obtained with a thickness of three and one-half thousandths of an inch. As illustrated in the drawing, there are provided a pair of identical metal sheets or foils designated by the reference numerals 39 and 40, the foil 39 being associated with the grid 13, while the foil 40 is associated with the grid 16. Obviously, since the sheets are identical, they can be used interchangeably. As illustrated, the sheets have a peripheral dimension so that they will readily fit inside the peripheral flange 12 associated with the lower grid 13. To permit ready removal of this metal sheet or foil 39 from the lower grid 13, it is preferably provided with a cutaway corner or notch designated at 41. By having a thickness of the order of three and one-half thousandths of an inch, the sheet is sufficiently thin so as to conform with the surfaces of the projections 14 or the projections 17, as the case may be, as clearly indicated in Fig. 4 of the drawing, particularly when a sandwich 25 to be toasted is interposed between the sheets 39 and 40, whereby the pressure provided by the weight of the upper case 15 will cause the sheets or foils to be pressed into intimate heat exchange relationship with the surfaces of all the projections 14 or 17, as the case may be. Moreover, by having a thickness within the range specified, and preferably of the order of three and one-half thousandths of an inch, there are sufficient heat conducting paths between the portions of the sheet in intimate heat exchange relationship with the projections of the grids to the portions of the sheet not in such intimate heat exchange relationship to provide uniform heat distribution. The sheets are preferably made of aluminum foil. Also, it has been discovered that when the sheets are thinner than one thousandth of an inch, sufficient conductivity is not afforded and hot spots are provided, with the result that the sandwiches are toasted in a spotty manner. In a commercial embodiment built in accordance with the present invention where the foils or sheets 39 and 40 have a thickness of the order of three and one-half thousandths of an inch, uniform toasting occurred within a period of six minutes. As soon as the thickness of the sheet was increased above the range specified, not only was there a substantial increase in the time required for satisfactory toasting, but the sheets began to be sufficiently thick so as not to conform to the surface defined by the projections, and hence not provide intimate heat exchange relationship between the projections and the corresponding portions on the sheets.

With the arrangement described above, it will be apparent that the foil or sheet 39 associated with the grid 13 will remain in proper position by virtue of the peripheral flange 12 and the action of gravity. However, this will not apply to the foil 40, and, in accordance with the present invention, there is provided suitable and inconspicuous means for maintaining the sheet 40 in its proper position when the upper case 15 is in the position of Fig. 1, for example. To this end there is provided a suitable clip or clamping means generally designated by the reference numeral 43, which is disposed within the partial enclosure defined by the handle 39, so that when not used to clip or hold the foil 40 in position, it is inconspicuous and out of the way, as indicated by dotted lines in Fig. 3 of the drawing. The grill clamp or clamping means 43 comprises an element 44 suitably secured to the edge of the upper case 15 within the partial enclosure formed by the handle 29. This element 44 comprises, when mounted on the case 15 disposed in the position shown in Fig. 3 of the drawing, a pair of downwardly extending spring fingers 45, separated a substantial distance, and between which there is disposed another spring finger 46 substantially wider than the spring fingers 45. The grill clamp additionally comprises a movable clamping element 48 which is essentially an L-shaped member, as best shown in Fig. 3 of the drawing, and includes a pair of integral trunnion-like members 49 received beneath the spring fingers 45. As best shown in Fig. 2 of the drawing, the main body portion of the grill clamp element 48 presses downwardly on the spring finger 46, as viewed in Fig. 2 of the drawing. Moreover, since the trunnion-like members 49 are of sheet metal material having a substantially greater width than thickness, the clamp provides a sort of overcenter device which tends to move either to its clamping position shown in solid lines in Fig. 3, or to its nonclamping position shown in dotted lines in Fig. 3. The spring fingers 45 and 46 tend to bias the element 48 into one or the other of these extreme positions.

In further accordance with the present invention, the grill clamp 43 is mounted so that when the element 48 is in its clamping position one leg of the L is substantially parallel with the foil 40 in the position shown in Figs. 1 and 3 to clamp the same against the peripheral edge of the upper grid 16. To insure good clamping action, this leg of the L-shaped grill clamp element 48 is preferably provided with indentations or deformations such as 50. To facilitate unclamping action, the end of the clamping leg having the indentations 50 is preferably provided with a projecting flange 51 so that the operator may merely engage this flange to release the grill clamp.

In view of the detailed description included above, the operation of the present invention will readily be understood by those skilled in the art. When it is desired to convert a waffle iron to a sandwich toaster, the foil sheets are placed in position, with the upper foil being held in place by the grill clamp 43, while the lower one is held in position by the peripheral flange 12. By virtue of the critical dimensions of the sheets insofar as thickness is concerned, there is provided a sandwich toaster which affords the same accurate temperature control that is afforded when the waffle baker is used for baking waffles. Moreover, sandwiches are toasted within a minimum of time and uniform heating occurs.

It will be understood that although the arrangement described employs a waffle baker having rectangular grids, the present invention can also be used with waffle irons having circular grids. Considerable advantage, of course, accrues where rectangular grids are employed by virtue of the fact that sandwiches can normally better be fitted on a rectangular grid.

While there has been illustrated and described what is at present believed to be the preferred embodiment of the present invention, numerous changes and modifications will occur to those skilled in the art, and it is aimed in the appended claims to cover all such changes and modifications as fall within the true spirit and scope of the present invention.

What is claimed as new and desired to be secured by Letters Patent of the United States is,

1. In combination with a waffle iron comprising a base, a cover hinged to said base and movable between a first position wherein said cover is disposed remote from said base to a second position wherein said cover overlies said base, a waffle grid mounted in said base, a waffle grid mounted in said cover, said grids being disposed in opposed relationship when said cover is in said second position to cook a waffle therebetween, electric heating means for heating each of said grids, a handle for moving said cover between said two positions, means for converting said waffle iron to a sandwich toaster comprising a pair of metal sheets one to overlie each of said grids, and a movable clip on said cover partially enclosed by said handle for releasably holding said sheet associated with the grid in said cover in position while said cover moves between said first and second positions.

2. In combination with a waffle iron comprising a base, a cover, hinge means for hinging said cover to said base for movement between a first position wherein said cover is disposed remote from said base to a second position wherein said cover overlies said base, a waffle grid mounted in said base, a waffle grid mounted in said cover, said grids being disposed in opposed relationship when said cover is in said second position to cook a waffle therebetween, individual electric heating means for heating each of said grids, a handle for moving said cover between said two positions, means for converting said waffle iron to a sandwich toaster comprising a pair of metal sheets one to overlie each of said grids, a movable clip on said cover partially enclosed by said handle so as to be inconspicuous for releasably holding said sheet associated with the grid in said cover in position while said cover moves between said first and second positions, said hinge means including a slotted connection to allow substantial separation of said grids when said cover is in said second position to toast a sandwich of substantial thickness between said sheets.

3. In combination with a waffle iron having a pair of opposed grids, means for supporting said grids for movement between a first position wherein said grids are remotely disposed to a second position wherein said grids are superimposed with the cooking surfaces thereof adjacent, means for converting said waffle iron to a sandwich toaster comprising a pair of metal foil sheets each engaging with the cooking surface of a different one of said grids, a manually graspable handle for moving one of said grids relative to the other, said handle defining a partial enclosure, a clip disposed within said enclosure including a movable portion movable from a position within said enclosure to a clamping position for clamping one of said sheets in a predetermined position relative to said one grid, and means forming a part of said clip for biasing said movable portion into clamping engagement with the edge of said one sheet.

References Cited in the file of this patent
UNITED STATES PATENTS

| | | |
|---|---|---|
| 655,530 | Vossbeck | Aug. 7, 1900 |
| 1,154,411 | Kuhn et al. | Sept. 21, 1915 |
| 1,174,031 | Hadaway | Feb. 29, 1916 |
| 1,661,294 | LeMaster | Mar. 6, 1928 |
| 2,027,296 | Stuart et al. | Jan. 7, 1936 |
| 2,070,706 | Benson | Feb. 16, 1937 |
| 2,117,579 | Smith | May 17, 1938 |
| 2,146,171 | Burch | Feb. 7, 1939 |
| 2,174,425 | Schlumbohm | Sept. 26, 1939 |
| 2,431,332 | Jordon | Nov. 25, 1947 |
| 2,466,859 | Northup | Apr. 12, 1949 |
| 2,567,382 | Knapp | Sept. 11, 1951 |

FOREIGN PATENTS

| | | |
|---|---|---|
| 224,904 | Great Britain | June 11, 1925 |